United States Patent
Holzer et al.

(10) Patent No.: US 10,504,293 B2
(45) Date of Patent: *Dec. 10, 2019

(54) AUGMENTING MULTI-VIEW IMAGE DATA WITH SYNTHETIC OBJECTS USING IMU AND IMAGE DATA

(71) Applicant: Fyusion, Inc., San Francisco, CA (US)

(72) Inventors: Stefan Johannes Josef Holzer, San Mateo, CA (US); Stephen David Miller, San Francisco, CA (US); Alexander Jay Bruen Trevor, San Francisco, CA (US); Martin Saelzle, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,227

(22) Filed: Nov. 5, 2018

(65) Prior Publication Data
US 2019/0073834 A1    Mar. 7, 2019

Related U.S. Application Data

(63) Continuation of application No. 15/009,807, filed on Jan. 28, 2016, now Pat. No. 10,152,825.
(Continued)

(51) Int. Cl.
*G06T 19/00* (2011.01)
*G06T 13/20* (2011.01)

(52) U.S. Cl.
CPC ............ *G06T 19/006* (2013.01); *G06T 13/20* (2013.01); *G06T 2219/028* (2013.01)

(58) Field of Classification Search
CPC ....... G06T 13/20; G06T 19/00; G06T 19/006; G06T 7/70; G06T 7/80;
(Continued)

(56) References Cited

U.S. PATENT DOCUMENTS 9,581,431 B1    2/2017 Sieracki
2007/0237417 A1    10/2007 Agrawal
(Continued)

FOREIGN PATENT DOCUMENTS

DE    112016004731 T5    10/2018
GB    2543416 A    4/2017
(Continued)

OTHER PUBLICATIONS

Salih, Depth and Geometry from a Single 2D Image Using Triangulation, 2012 IEEE International Conference on Multimedia and Expo Workshops (Year: 2012).*
(Continued)

*Primary Examiner* — Phuc N Doan
(74) *Attorney, Agent, or Firm* — Kwan & Olynick LLP (57) ABSTRACT

Provided are mechanisms and processes for augmenting multi-view image data with synthetic objects using inertial measurement unit (IMU) and image data. In one example, a process includes receiving a selection of an anchor location in a reference image for a synthetic object to be placed within a multi-view image. Movements between the reference image and a target image are computed using visual tracking information associated with the multi-view image, device orientation corresponding to the multi-view image, and an estimate of the camera's intrinsic parameters. A first synthetic image is then generated by placing the synthetic object at the anchor location using visual tracking information in the multi-view image, orienting the synthetic object using the inverse of the movements computed between the reference image and the target image, and projecting the synthetic object along a ray into a target view associated with the target image. The first synthetic image is overlaid on the target image to generate an augmented image from the target view.

20 Claims, 5 Drawing Sheets

Related U.S. Application Data (60) Provisional application No. 62/242,932, filed on Oct. 16, 2015.

(58) Field of Classification Search
CPC ..... G06T 2207/30244; G06T 2219/028; G06F 3/0425; G06F 17/30811
See application file for complete search history.

(56) References Cited

U.S. PATENT DOCUMENTS

| | | |
|---|---|---|
| 2007/0296721 A1 | 12/2007 | Chang et al. |
| 2008/0074424 A1 | 3/2008 | Carignano |
| 2008/0239327 A1* | 10/2008 | Bryll .................... G01B 21/042 356/623 |
| 2011/0298830 A1 | 12/2011 | Lam |
| 2012/0154390 A1 | 6/2012 | Narita et al. |
| 2012/0249741 A1 | 10/2012 | Maciocci et al. |
| 2012/0268490 A1 | 10/2012 | Sugden |
| 2013/0044128 A1 | 2/2013 | Liu et al. |
| 2013/0127827 A1 | 5/2013 | Shiell et al. |
| 2013/0307842 A1 | 11/2013 | Grinberg et al. |
| 2013/0321583 A1* | 12/2013 | Hager .................... G06T 7/0012 348/46 |
| 2013/0332064 A1 | 12/2013 | Funk et al. |
| 2014/0267397 A1 | 9/2014 | Wagner et al. |
| 2014/0306866 A1* | 10/2014 | Miller .................... G06T 19/006 345/8 |
| 2014/0320661 A1* | 10/2014 | Sankar .................... H04N 7/183 348/158 |
| 2015/0254281 A1 | 9/2015 | Sauve et al. |
| 2017/0109930 A1 | 4/2017 | Holzer et al. |

FOREIGN PATENT DOCUMENTS

| | | |
|---|---|---|
| WO | 2010142897 A2 | 12/2010 |
| WO | 2017065975 A1 | 4/2017 |

OTHER PUBLICATIONS

"U.S. Appl. No. 15/009,807, Examiner Interview Summary dated Dec. 19, 2017", 3 pages.

"U.S. Appl. No. 15/009,807, Final Office Action dated Mar. 28, 2018", 19 pages.

"U.S. Appl. No. 15/009,807, Non Final Office Action dated Sep. 8, 2017", 18 pgs.

"International Application Serial No. PCT/US16/54218, Int'l Search Report and Written Opinion dated Dec. 8, 2016", 6 pages.

"Int'l Application Serial No. PCT/US16/54218, Int'l Preliminary Report on Patentability dated Apr. 26, 2018", 5 pages.

Alqursh, Ali et al., "Line-Based Relative Pose Estimation", retrieved from Internet <http://www.cs.rutgers.edu/~elgammal/pub/CVPR11_Elqursh.pdf> on Oct. 28, 2015, 8 pgs.

Kneip, Laurent et al., "Direct Optimization of Frame-to-Frame ROtation", Retrieved from the Internet <http://www.cv-foundation.org/openaccess/content_iccv_2013/papers/Kneip_Direct_Optimization_of_2013_ICCV_paper.pdf> on Oct. 28, 2015, 8 pgs.

* cited by examiner

Reference image 301
Object in Reference View 305
Anchor Location 309
Synthetic Image in Reference View 311

FIG. 3A

Target image 303
Synthetic Image in Target View 313
Anchor Location 309
Object in Target View 307

AUGMENTING MULTI-VIEW IMAGE DATA WITH SYNTHETIC OBJECTS USING IMU AND IMAGE DATA

CROSS-REFERENCE TO RELATED APPLICATIONS

The present application is a continuation of U.S. patent application Ser. No. 15/009,807 by Holzer et al., filed on Jan. 28, 2016, entitled, "AUGMENTING MULTI-VIEW IMAGE DATA WITH SYNTHETIC OBJECTS USING IMU AND IMAGE DATA," which claims priority under 35 U.S.C. § 119 to Provisional U.S. Patent Application No. 62/242,932 by Holzer et al., filed on Oct. 16, 2015, titled "AUGMENTING MULTI-VIEW IMAGE DATA WITH SYNTHETIC OBJECTS USING IMU AND IMAGE DATA," which are incorporated by reference herein in their entirety and for all purposes.

TECHNICAL FIELD

The present disclosure relates to augmenting multi-view image data with synthetic objects. In one example, the present disclosure relates to using inertial measurement unit (IMU) and image data to generate views of synthetic objects to be placed in a multi-view image.

BACKGROUND

Augmented reality typically includes a view of a real-world environment, such as through video and/or image data of scenery, a sports game, an object, individual, etc. This view of the real-world environment is augmented by computer generated input such as images, text, video, graphics, or the like. Accordingly, augmented reality can take the form of a live-action video or photo series with added elements that are computer-generated. Augmented reality is distinct from virtual reality, in which a simulated environment is depicted through video and/or image data.

In some implementations, augmented reality applications may add three-dimensional (3D) information to video and image data. This is generally done by creating a 3D reconstruction of the scene. However, this process is computationally expensive and usually restricted to static scenes. Accordingly, improved methods of implementing augmented reality are desirable.

SUMMARY

Provided are various mechanisms and processes relating to augmenting multi-view image data with synthetic objects using inertial measurement unit (IMU) and image data.

In one aspect, which may include at least a portion of the subject matter of any of the preceding and/or following examples and aspects, a process includes receiving a selection of an anchor location in a reference image for a synthetic object to be placed within a multi-view image. Movements between the reference image and a target image are computed using visual tracking information associated with the multi-view image, device orientation corresponding to the multi-view image, and an estimate of the camera's intrinsic parameters. A first synthetic image is then generated by placing the synthetic object at the anchor location using visual tracking information in the multi-view image, orienting the synthetic object using the inverse of the movements computed between the reference image and the target image, and projecting the synthetic object along a ray into a target view associated with the target image. The first synthetic image is overlaid on the target image to generate an augmented image from the target view.

In another aspect, which may include at least a portion of the subject matter of any of the preceding and/or following examples and aspects, a computer readable medium includes computer code for receiving a selection of an anchor location in a reference image for a synthetic object to be placed within a multi-view image. The computer readable medium further includes computer code for computing movements between the reference image and a target image using visual tracking information associated with the multi-view image, device orientation corresponding to the multi-view image, and an estimate of the camera's intrinsic parameters. The computer readable medium also includes computer code for generating a first synthetic image by placing the synthetic object at the anchor location using visual tracking information in the multi-view image, orienting the synthetic object using the inverse of the movements computed between the reference image and the target image, and projecting the synthetic object along a ray into a target view associated with the target image. The computer readable medium further includes computer code for overlaying the first synthetic image on the target image to generate an augmented image from the target view.

In yet another aspect, which may include at least a portion of the subject matter of any of the preceding and/or following examples and aspects, an apparatus includes means for receiving a selection of an anchor location in a reference image for a synthetic object to be placed within a multi-view image. The apparatus further includes means for computing movements between the reference image and a target image using visual tracking information associated with the multi-view image, device orientation corresponding to the multi-view image, and an estimate of the camera's intrinsic parameters. The apparatus also includes means for generating a first synthetic image by placing the synthetic object at the anchor location using visual tracking information in the multi-view image, orienting the synthetic object using the inverse of the movements computed between the reference image and the target image, and projecting the synthetic object along a ray into a target view associated with the target image. The apparatus further includes means for overlaying the first synthetic image on the target image to generate an augmented image from the target view.

These and other embodiments are described further below with reference to the figures.

DETAILED DESCRIPTION OF EXAMPLE EMBODIMENTS

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Augmented reality typically includes a view of a real-world environment, such as through video and/or image data, which is augmented by computer-generated input such as images, text, video, graphics, or the like. Current methods of adding three-dimensional (3D) information to video and image data generally involves creating a 3D reconstruction of the scene, which is computationally expensive and usually restricted to static scenes.

Accordingly, various mechanisms and processes described in the present disclosure relate to implementing augmented reality by adding a three-dimensional (3D) tag (also referred to herein as a synthetic object) such as an image, text, object, graphic, or the like to a multi-view image, where the multi-view image includes multiple views of a real-world environment. In particular examples, the three-dimensional tag "moves" with the multi-view image, such that as objects or scenery within the multi-view image rotate or otherwise move, the three-dimensional tag also moves as if it were physically present along with the objects or scenery. A particular view of the three-dimensional tag is referred to as a synthetic image, which can be added to a particular view of the multi-view image by overlaying the synthetic image on the image associated with the particular view in order to create an image with augmented reality.

The mechanisms and processes described herein provide numerous benefits. Specifically, the presented techniques avoid a computationally expensive three-dimensional reconstruction of a scene to be augmented. Instead, synthetic objects (also referred to as 3D tags) can be computed very efficiently and added to a multi-view image to create an augmented reality version of the multi-view image. In particular, various embodiments utilize rotational information provided by an inertial measurement unit (IMU) to estimate the orientation of the added three-dimensional objects. According to various embodiments, IMUs can be obtained from some combination of a gyroscope, accelerometer, and magnetometer. In particular embodiments, IMUs are obtained from a device or a combination of devices that can measure relative device orientation changes. Because this IMU-provided information only provides details about the orientation of the 3D tag, but not its 3D position, an anchor location in the image data is tracked in order to fix the 3D tag to a reference location in the 3D space. In some examples, tracking in 2D image space is sufficient as two degrees of freedom of the 3D location can be estimated using the tracking in x and y-direction, and the third degree of freedom can be estimated by estimating the scale change between different viewpoints of the multi-view image data set and/or by also estimating scale changes while tracking the 2D location of the point of interest.

Another benefit of the mechanisms and processes described herein is that they can be used with non-static scenes, even if the 3D tag is attached to a relatively small moving object. Because it is only necessary to track a single point for the presented method to work, this method also works in highly dynamic scenes, which are generally problematic for 3D scene reconstruction. In particular, using 3D scene reconstruction methods may cause the 3D virtual object to be inaccurately augmented in a highly dynamic scene. However, using the mechanisms and processes described in various examples herein, 3D virtual objects (also referred to as 3D tags or synthetic objects) that are correctly attached to small moving objects in a scene (including scenes that are highly dynamic overall) will tend to produce a correctly augmented scene with the 3D virtual object.

According to various embodiments, a multi-view image as referred to herein, includes multiple views of a real-world environment, which may include objects, scenery, etc. In some examples, a multi-view image can be a surround view, as described in conjunction with U.S. patent application Ser. No. 14/530,669 by Holzer et al., filed on Oct. 31, 2014, titled "Analysis and Manipulation of Images and Video for Generation of Surround Views," which is incorporated by reference herein in its entirety and for all purposes.

According to various embodiments, a surround view is constructed from multiple images that are captured from different locations. A computer processor is used to create a three-dimensional model that includes the content and context of the surround view. In some examples, the content and context can be segmented such that separate three-dimensional models can be provided for each of the content of the surround view and the context of the surround view.

In particular embodiments, a surround view is a multi-view interactive digital media representation. Various systems and methods can be used to analyze the spatial relationship between multiple camera images and video streams together with location information data, for the purpose of creating a single representation, a surround view, which eliminates redundancy in the data, and presents a user with an interactive and immersive active viewing experience. In some examples, active is described in the context of providing a user with the ability to control the viewpoint of the visual information displayed on a screen.

Various embodiments of the present disclosure describe mechanisms and processes used to place a synthetic object, such as text or an object, into a scene which is captured as a multi-view image data set by a device that has an inertial measurement unit (IMU). In some examples, a multi-view image data set shows a scene from different angles. For instance, a multi-view image data set can be captured while rotating a camera around its own center (panoramic case), while rotating the camera around one or multiple objects of interest (object case), while translating the camera, or while combining these movements. An IMU provides information about the orientation of a device while capturing the images.

Figures 1A, 1B:
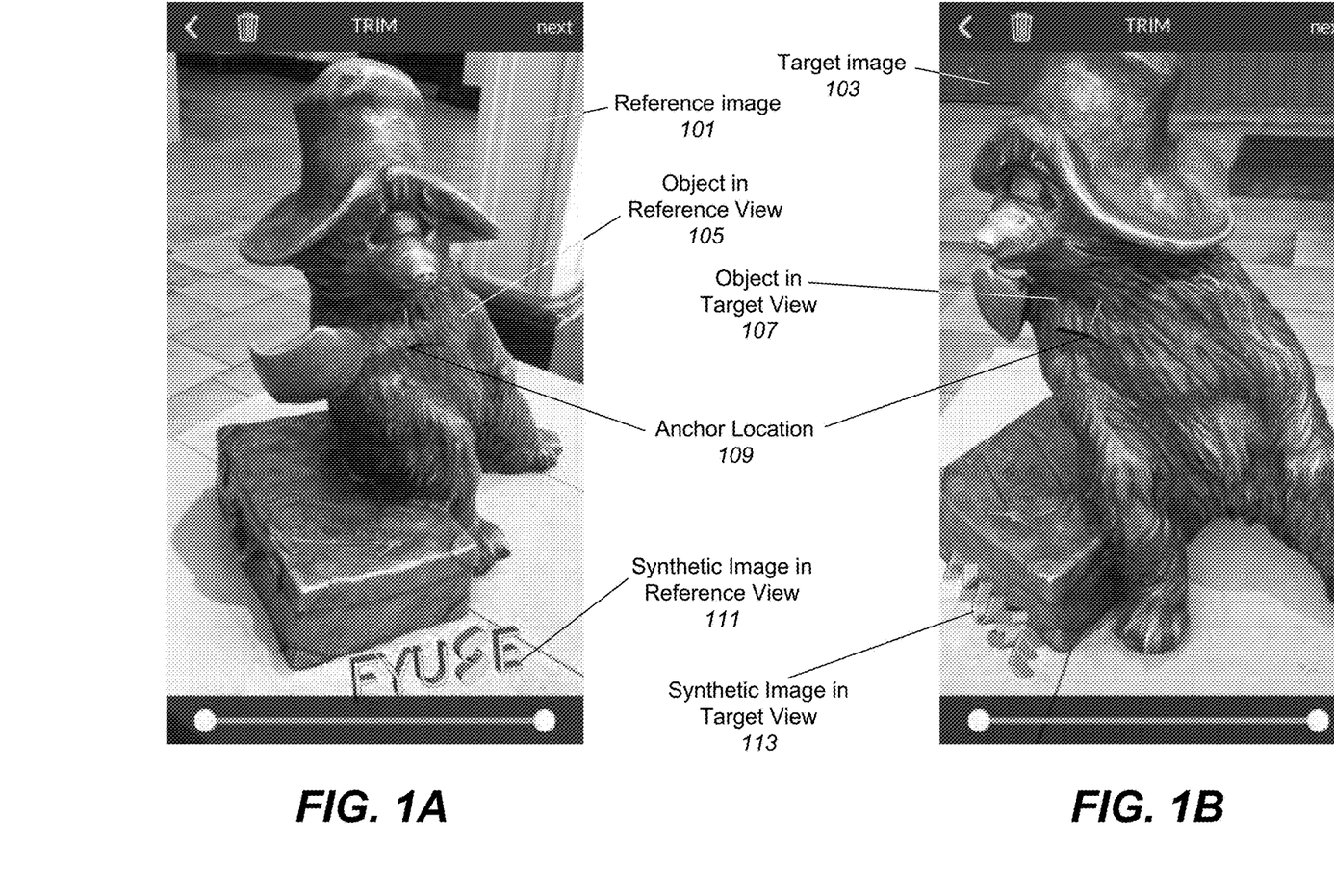
FIG. 1A is an example of a reference image with a first view of a synthetic object.
FIG. 1B is an example of a target image with a second view of the synthetic object.
Figures 2A, 2B:
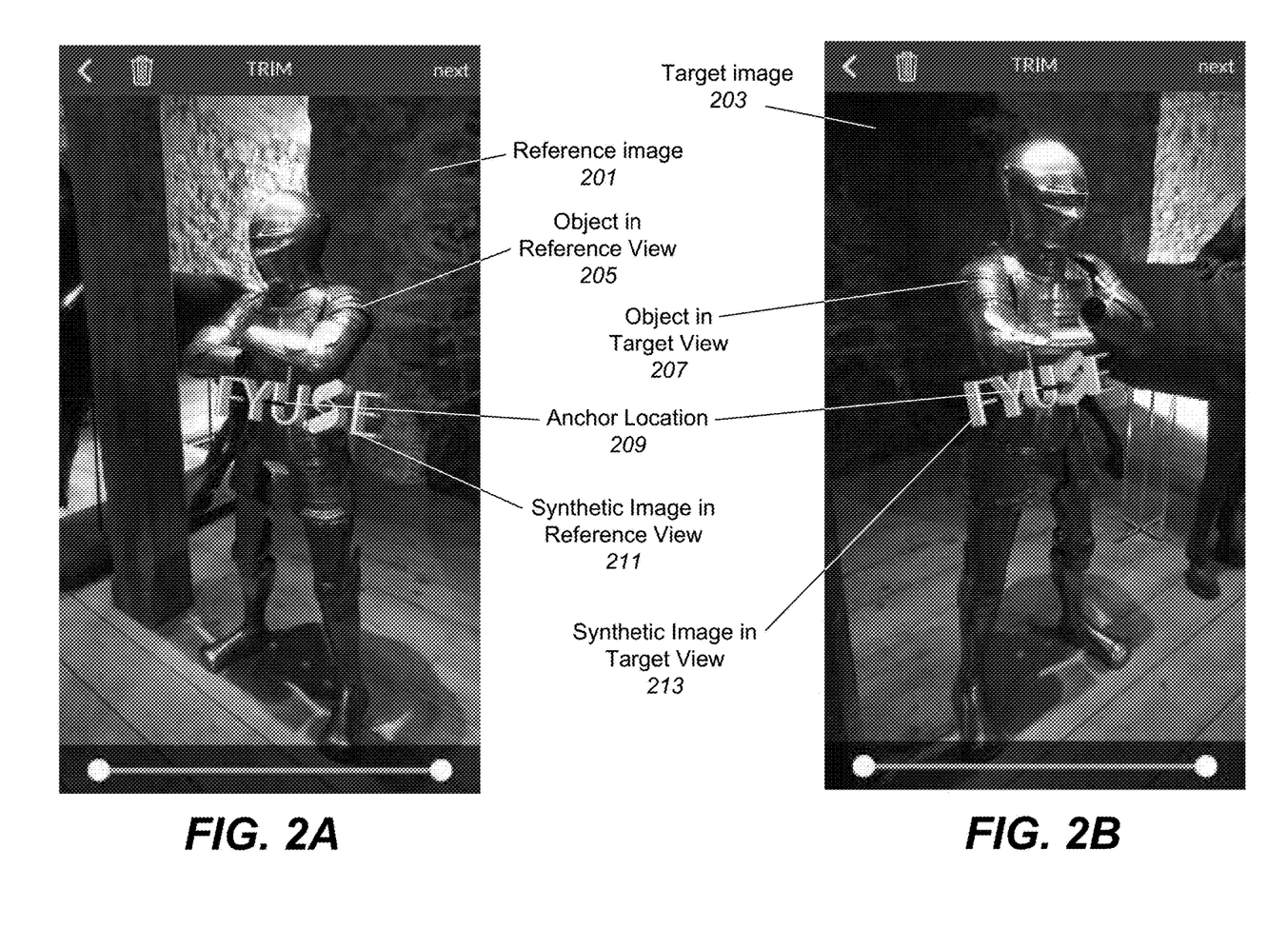
FIG. 2A is an example of a reference image with a first view of a synthetic object.
FIG. 2B is an example of a target image with a second view of the synthetic object.
Figure 3A:
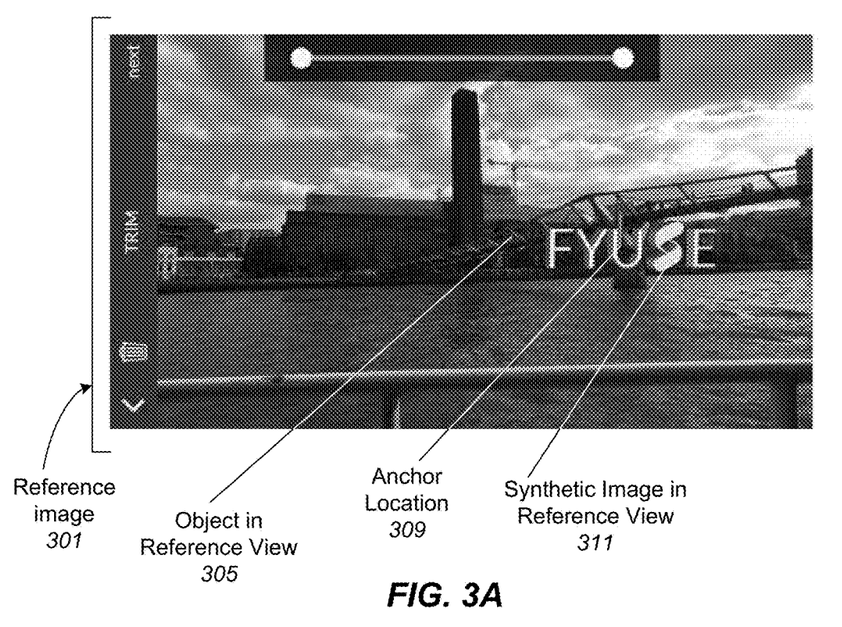
FIG. 3A is an example of a reference image with a first view of a synthetic object.
Figure 3B:
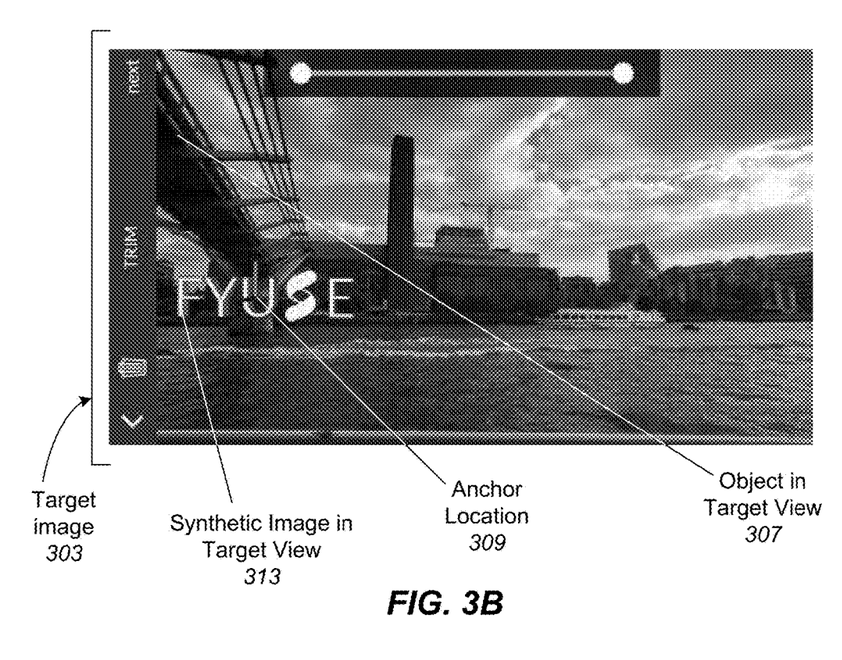
FIG. 3B is an example of a target image with a second view of the synthetic object.

FIGS. 1-3, illustrate examples of multi-view images augmented with synthetic objects. In particular, FIGS. 1A-1B and 2A-2B each show different views of an object-centered multi-view image and the corresponding views of a synthetic object placed in the multi-view image. Furthermore, FIGS. 3A-3B show different views of a multi-view image that includes translational motion relative to the content in the multi-view image, and the corresponding views of a synthetic object placed in the multi-view image.

With reference to FIGS. 1A-1B, shown is one example of an object-centered multi-view image augmented with a synthetic object. Specifically, FIG. 1A shows an example of a reference image with a first view of a synthetic object. According to various embodiments, a reference image 101 refers to a view (i.e. reference view) in the multi-view image where an anchor location 109 is selected for a synthetic object to be placed in the multi-view image. FIG. 1B shows an example of a target image with a second view of the synthetic object. According to various embodiments, a target image 103 refers to a view (i.e. target view) in the multi-view image for which a synthetic image is generated. This synthetic image is then overlaid on the target image to yield an augmented reality version of the target image. By generating synthetic images for various target views and overlaying these synthetic images on the corresponding target images, an augmented reality version of the multi-view image can be generated.

In the present example, FIG. 1A shows a reference image 101 from a reference view of a multi-view image. An object, such as the statue shown, is viewed as an image from the reference view at 105. In this reference view, an anchor location 109 is selected. In particular examples, a synthetic object is attached to the anchor location 109 in a multi-view image and positioned relative to this anchor location 109. This location can be stationary or moving, depending on the desired effects in the augmented reality version of the multi-view image. In some examples, the anchor location 109 remains at a fixed location in 3D space within the multi-view image. However, the anchor location 109 in the reference view may correspond to an initial placement location in other examples. In some instances, the synthetic object is located at the anchor location 109 and in other instances, the synthetic object is located at some distance from the anchor location 109. In the present example, the synthetic object is placed at a distance from the anchor location 109. The synthetic object may remain at a fixed location relative to the anchor location 109 in some examples, but may move relative to the anchor location 109 in other examples. As illustrated in the present example, the synthetic object is shown as a synthetic image in the reference view at 111.

In the present example, FIG. 1B shows a target image 103 from a target view of a multi-view image. The object, the same statue shown in FIG. 1A, is shown as an image from the target view at 107. From this target view, the anchor location 109 is shown, with the synthetic object and orientation axes rotated according to this view. As shown, the orientation axes remain fixed relative to the statue. Furthermore, the synthetic object is shown as a synthetic image in the target view at 113. In the present example, the synthetic object appears to remain at a fixed location relative to the anchor location 109. As described above, synthetic images can be generated for various target views to create an augmented reality version of the multi-view image. In the present example, various viewpoints included in the multi-view image data set would show the scene from different angles, so the augmented views of the multi-view image would also show the synthetic object from different angles and positioned such that it seems as the synthetic object remains at a fixed 3D location in the scene relative to its anchor location.

With reference to FIGS. 2A-2B, shown is another example of an object-centered multi-view image augmented with a synthetic object. Specifically, FIG. 2A shows an example of a reference image 201 with a first view of a synthetic object. According to various embodiments, a reference image 201 refers to a view (i.e. reference view) in the multi-view image where an anchor location 209 is selected for a synthetic object to be placed in the multi-view image. FIG. 2B shows an example of a target image 203 with a second view of the synthetic object. According to various embodiments, a target image 203 refers to a view (i.e. target view) in the multi-view image for which a synthetic image is generated. This synthetic image is then overlaid on the target image to yield an augmented reality version of the target image. By generating synthetic images for various target views and overlaying these synthetic images on the corresponding target images, an augmented reality version of the multi-view image can be generated.

In the present example, FIG. 2A shows a reference image 201 from a reference view of a multi-view image. An object, such as the suit of armor shown, is viewed as an image from the reference view at 205. In this reference view, an anchor location 209 is selected. In particular examples, a synthetic object is attached to the anchor location 209 in a multi-view image and positioned relative to this anchor location 209. This location can be stationary or moving, depending on the desired effects in the augmented reality version of the multi-view image. In some examples, the anchor location 209 remains at a fixed location in 3D space within the multi-view image. However, the anchor location 209 in the reference view may correspond to an initial placement location in other examples. In some instances, the synthetic object is located at the anchor location 209, such as in the present example. In other instances, the synthetic object is located at some distance from the anchor location 209. The synthetic object may remain at a fixed location relative to the anchor location 209 in some examples, but may move relative to the anchor location 209 in other examples. As illustrated in the present example, the synthetic object is shown as a synthetic image in the reference view at 211.

In the present example, FIG. 2B shows a target image 203 from a target view of a multi-view image. The object, the same suit of armor shown in FIG. 2A, is shown as an image from the target view at 207. From this target view, the anchor location 209 is shown, with the synthetic object and orientation axes rotated according to this view. As shown, the orientation axes move relative to the suit of armor and the synthetic object follows the position of the axes. In the present example, the synthetic object appears to remain at a fixed location relative to the anchor location 209. Furthermore, the synthetic object is shown as a synthetic image in the target view at 213. As described above, synthetic images can be generated for various target views to create an augmented reality version of the multi-view image. In the present example, various viewpoints included in the multi-view image data set would show the scene from different angles, such that the augmented views of the multi-view image would also show the synthetic object from different angles and positioned such that it seems as the synthetic object remains at a fixed 3D location relative to its anchor location.

With reference to FIGS. 3A-3B, shown are two views of a multi-view image augmented with a synthetic object, where the multi-view image includes translational motion relative to the content in the multi-view image. In particular, FIG. 3A shows an example of a reference image with a first view of a synthetic object. As described above, a reference image 301 refers to a view (i.e. reference view) in the multi-view image where an anchor location 309 is selected for a synthetic object to be placed in the multi-view image. FIG. 3B shows an example of a target image with a second view of the synthetic object. As also described above, a target image 303 refers to a view (i.e. target view) in the multi-view image for which a synthetic image is generated. This synthetic image is then overlaid on the target image to yield an augmented reality version of the target image. By generating synthetic images for various target views and overlaying these synthetic images on the corresponding target images, an augmented reality version of the multi-view image can be generated.

In the present example, FIG. 3A shows a reference image 301 from a reference view of a multi-view image. An object, such as the bridge shown, is viewed as an image from the reference view at 305. In this reference view, an anchor location 309 is selected. In particular examples, a synthetic object is attached to the anchor location 309 in a multi-view image and positioned relative to this anchor location 309. This location can be stationary or moving, depending on the desired effects in the augmented reality version of the multi-view image. In some examples, the anchor location 309 remains at a fixed location in 3D space within the multi-view image. However, the anchor location 309 in the reference view may correspond to an initial placement location in other examples. In some instances, the synthetic object is located at the anchor location 309 and in other instances, the synthetic object is located at some distance from the anchor location 309. In the present example, the synthetic object is placed at the anchor location 309. The synthetic object may remain at a fixed location relative to the anchor location 309 in some examples, but may move relative to the anchor location 309 in other examples. As illustrated in the present example, the synthetic object is shown as a synthetic image in the reference view at 311.

In the present example, FIG. 3B shows a target image 303 from a target view of a multi-view image. The object, the same bridge shown in FIG. 3A, is shown as an image from the target view at 307. From this target view, the anchor location 309 is shown, with the synthetic object and orientation axes rotated according to this view. As shown, the orientation axes move relative to the bridge and the synthetic object follows the position of the axes. In the present example, the synthetic object appears to remain at a fixed location relative to the anchor location 309. The synthetic object is shown as a synthetic image in the target view at 313. As described above, synthetic images can be generated for various target views to create an augmented reality version of the multi-view image. In the present example, various viewpoints included in the multi-view image data set would show the scene from different angles, such that the augmented views of the multi-view image would also show the synthetic object from different angles and positions.

The examples described with regard to FIGS. 1-3 include synthetic objects that are either stationary or static in nature. However, a synthetic object (i.e., three-dimensional tag) can include a stationary object in some embodiments, but can also include an animated object in other embodiments. Animated versions of a synthetic object can take various forms. In one example, animation of a synthetic object is independent of any user navigation through the scene. Specifically, the animation of the synthetic object is based on the amount of time that passes while a user views it. Consequently, if a user stays on the same view for a longer period of time, the animation will continue. In another example, animation of a synthetic object is dependent on the navigation, such as when the user navigates through the multi-view image. In particular, animation of the synthetic object progresses when navigation is present, such that the animation is dependent on the spatial movement of the camera. Specifically, animation of the synthetic object progresses forward either 1) independent of the direction of the navigation, or 2) if navigation is in one direction and backwards if navigation is in the other direction. In yet another example, animation of a synthetic object is dependent on recording time, such that animation of the synthetic object progresses relative to the time that passed while the data was recorded. According to various embodiments, a synthetic object that is rendered into a scene can be represented by a video. This video can include animated images in some examples.

In particular embodiments, the multi-view image to be augmented with a synthetic object may include dynamic aspects itself. For instance, the multi-view image may include dynamic content, such as moving or animated objects. Additionally, the multi-view image may include dynamic context, such as moving or animated background elements. In various examples, dynamic context can also include animation or videos. Furthermore, some multi-view images may include both dynamic content and context. Regardless of the amount of dynamic content or context in a multi-view image, a synthetic object can be added to the multi-view image according to the process described in various examples of this disclosure without requiring additional processing or resources.

Figure 4:
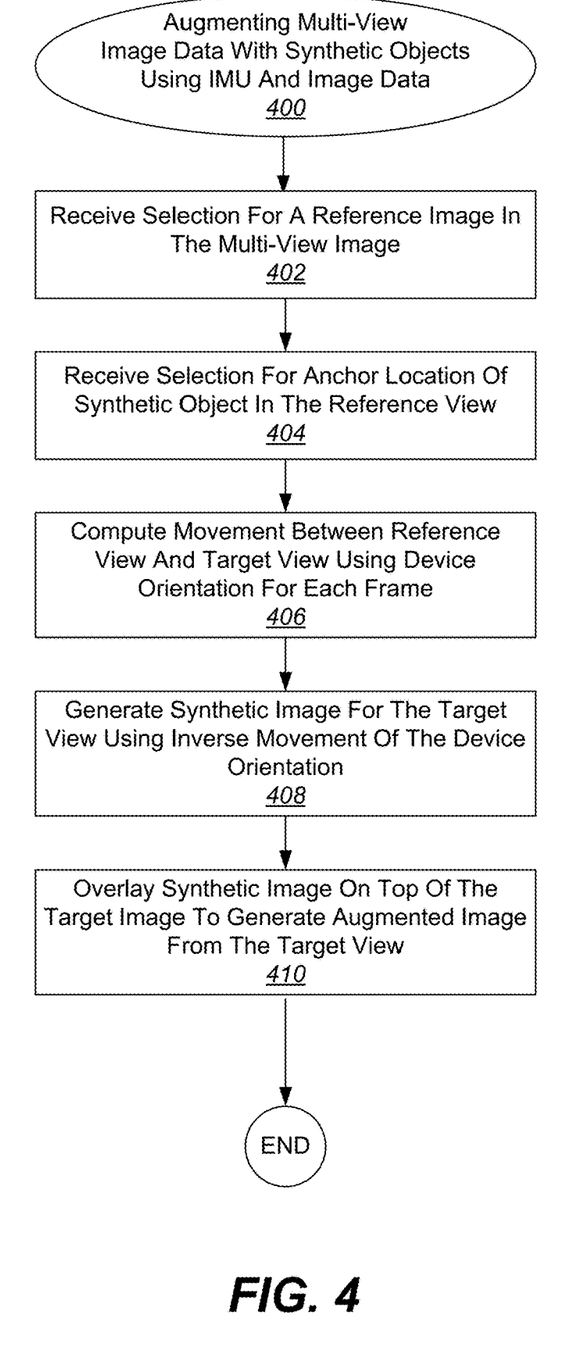
FIG. 4 is an example of a process for augmenting multi-view image data with synthetic objects using IMU and image data.

With reference to FIG. 4, shown is example of a process for augmenting multi-view image data with one or more synthetic objects using IMU and image data. In particular, the process includes augmenting a multi-view image dataset with a synthetic object, such as a tag, text, object, video, graphics, or other image data, including animated object(s) or image data, such that the synthetic object appears to be positioned in the scene of the multi-view image, and transforms in the same way as the image sequence. Accordingly, this method generates an augmented multi-view image that gives the illusion that the synthetic object is physically present in the scene.

According to various embodiments, the process 400 begins with a selection of a reference image at 402 from the multi-view image. In various examples, the multi-view image is captured with a camera having intrinsic parameters. Additionally, as described in various examples, the reference image corresponds to one view of the multi-view image. This reference image is selected as the view from which an anchor location for the synthetic object will be specified. In some examples, this reference image/view is selected by the user and this selection is received at the computer system generating the augmented reality version of the multi-view image. In other examples, the reference image may be selected by the computer system to generate the augmented reality version of the multi-view image.

Next, in the present example, an anchor location is received at 404. According to various embodiments, the user specifies the anchor location, such as a point, from the reference image as a location for the synthetic object to be placed within the multi-view image. Three-dimensional coordinates for the anchor location and the synthetic object correspond to the 2D coordinates specified in the reference image along with a depth perpendicular to the plane of the reference image. This depth can be specified in numerous ways. One way is to use a fixed depth. Another way is to scale a fixed depth based on scale changes in the multi-view representation. For instance, when zooming in or out is detected, the depth can be scaled accordingly. Yet another way is to scale a triangulated depth based on scale changes in the multi-view representation. Based on the depth specified, along with the 2D coordinates specified in the reference image, the anchor location has a 3D location in the multi-view image space.

For each image in the multi-view image in which tracking information is present, an image coordinate for the anchor location and synthetic object exists. According to various embodiments, a visual tracking system is employed to compute the image location of the synthetic object in other images in the sequence where the visual information can be tracked. Accordingly, using the reference image, anchor location, and an estimate of the imaging device/camera's intrinsic parameters enables calculation of the synthetic image from other views. In the present example, a synthetic image of the synthetic object can be generated for a target image. The synthetic image is projected along a virtual ray in 3D space that is oriented perpendicular to the plane of the target image.

According to various embodiments, a synthetic scene from the target view may be rendered using tracking information between the reference image and a target image from the multi-view image. In the present example, movements are computed at 406 between the reference image and a target image using visual tracking information associated with the multi-view image, device orientation corresponding to the multi-view image, and an estimate of the camera's intrinsic parameters, where the camera's intrinsic parameters includes at least an approximate estimate of a focal length. Specifically, the rotation and/or other movements between the reference frame and target frame can be computed using device orientation for each frame. In various embodiments, the process uses device orientation stored with or computed from the multi-view image. Furthermore, visual tracking information of a location or object in the multi-view image can be used to compute the rotation and/or movements. In addition, the process uses an estimate of the camera's intrinsic parameters, including at least an approximate estimate of the focal length.

According to various embodiments, the movements computed between the reference image and the target image can be determined from the orientation of the device that captured the images. In particular, the device orientation for each frame can be derived from IMU measurements obtained from an IMU that was attached to the device that obtained the reference image and target image. Such IMU devices are commonly integrated in modern smartphones. In some examples, in which the sample rate for the IMU information and sample rate for collecting image frames differs, the IMU information can be interpolated from the available data at times close to the timestamps corresponding to a given image frame.

According to various embodiments, if IMU information is not available for an image frame and cannot be interpolated from other IMU measurements that are taken at similar times, additional image-based methods can be used to estimate the rotation. In particular, for a panorama-like scenario, as well as in a translational scenario (such as depicted in FIGS. 3A-3B), where the camera is translated and only rotated around its z-axis, the tracking of two distinct points is sufficient to infer the necessary orientation information, namely, the in-plane image rotation. For a scenario in which the camera is rotated around an object (such as depicted in FIGS. 1A-1B and 2A-2B), an image-based estimation method can be used to estimate the camera rotation as described in conjunction with the following articles: 1) Kneip, Laurent, & Lynen, Simon, "Direct Optimization of Frame-to-Frame Rotation," Conference: Proceedings of the 2013 IEEE Conference on Computer Vision (ICCV), Dec. 1-8, 2013, pp. 2352-2359, DOI Bookmark: http://doi.ieee-computersociety.org/10.1109/ICCV.2013.292,and 2) Elqursh, Ali, & Elgammal, Ahmed, "Line-Based Relative Pose Estimation," Computer Vision and Pattern Recognition (CVPR), 2011, pp. 3049-3056, IEEE, DOI: 10.1109/CVPR.2011.5995512.

Next, a synthetic image corresponding to a target view associated with the target image is generated in the present example at 408. In particular, the synthetic object is placed at the anchor location (or a specified distance from the anchor location, as described above with regard to FIGS. 1-3) using visual tracking information associated with the anchor location in the multi-view image. The synthetic object is then oriented by rotating or otherwise moving the synthetic object along the inverse of the rotation and/or other movements computed between the reference image and the target image. More specifically, as the camera moves from the reference view to the target view, the synthetic object will appear to move in a motion opposite to the camera motion. Accordingly, to calculate the appropriate viewpoint of the synthetic object in the target view, the inverse of the camera movements between the reference view and target view can be applied to the synthetic object to orient the synthetic object from the reference view to the target view.

According to various embodiments, once the synthetic object is transformed such that it is oriented properly from the target view, the synthetic object can be placed in a virtual scene corresponding to the target view at some distance along a virtual ray. In particular, when rendering images for views other than the reference view, the synthetic object is rendered along a virtual ray corresponding to the new location as indicated by the tracking system. At the distance along the virtual ray corresponding to the target image, the 2D projection of the synthetic object is generated as the synthetic image for the target view.

In particular embodiments, the relative scale change between the images of the image sequence can optionally be computed and used to move the synthetic object correspondingly. For instance, if a zoom-in scale change happens, it can be assumed that the camera moves towards the synthetic object and if a zoom-out scale change happens, it can be assumed that the camera moves away from the synthetic object. This movement influences the distance along the 3D ray at which the 3D object is rendered.

According to various embodiments, an estimate of the camera's focal length (part of the intrinsic parameters) is used. However, the described method also works with an approximate value for this focal length. Accordingly, it is not necessary to calibrate each device separately.

As described in the present example, the synthetic object is imaged using a virtual camera configured with the estimated camera intrinsics to produce a virtual view that is consistent with the target image. The synthetic image produced from this virtual view is then overlaid on the target image at 410, and blended to produce a new, augmented image from the target view. As described in conjunction with various examples, this process can be repeated for multiple views in the multi-view image to generate an augmented reality version of the multi-view image that appears to include the synthetic object.

In particular embodiments, occlusion handling can be included in order to provide proper overlapping/placement of the synthetic object relative to the content and context in a multi-view image. Specifically, occlusion handling can be used to determine placement of a particular synthetic image in a corresponding scene from the multi-view image. For instance, occlusion handling can be used to place the synthetic image in a proper layer or with a proper amount or type of transparency for a particular view. Different scenarios can be addressed with occlusion handling. In one example, a 3D model of the scene is available. Specifically, this 3D model can be either computed from the multi-view data or acquired from some other source. In another example, a partial 3D model is available that only covers parts of the scene. In yet another example, the scene is segmented into different layers where each of these layers has a depth assigned. Based on the situation presented, occlusions can be accounted for when adding a synthetic object. In one particular example, occlusion handling is done as in other rendering approaches, where objects that are closer to the camera are rendered over objects that are farther away. According to various embodiments, synthetic objects can be transparent or semi-transparent. Transparency of part or all of a synthetic object in particular views can allow the synthetic image to appear accurately relative to other aspects in a corresponding image. Although transparency or semi-transparency, in whole or in part, of a synthetic object and any corresponding synthetic image can be used as part of occlusion handling, transparency or semi-transparency of a synthetic object or synthetic image may occur independent of occlusion handling in some cases.

Figure 5:
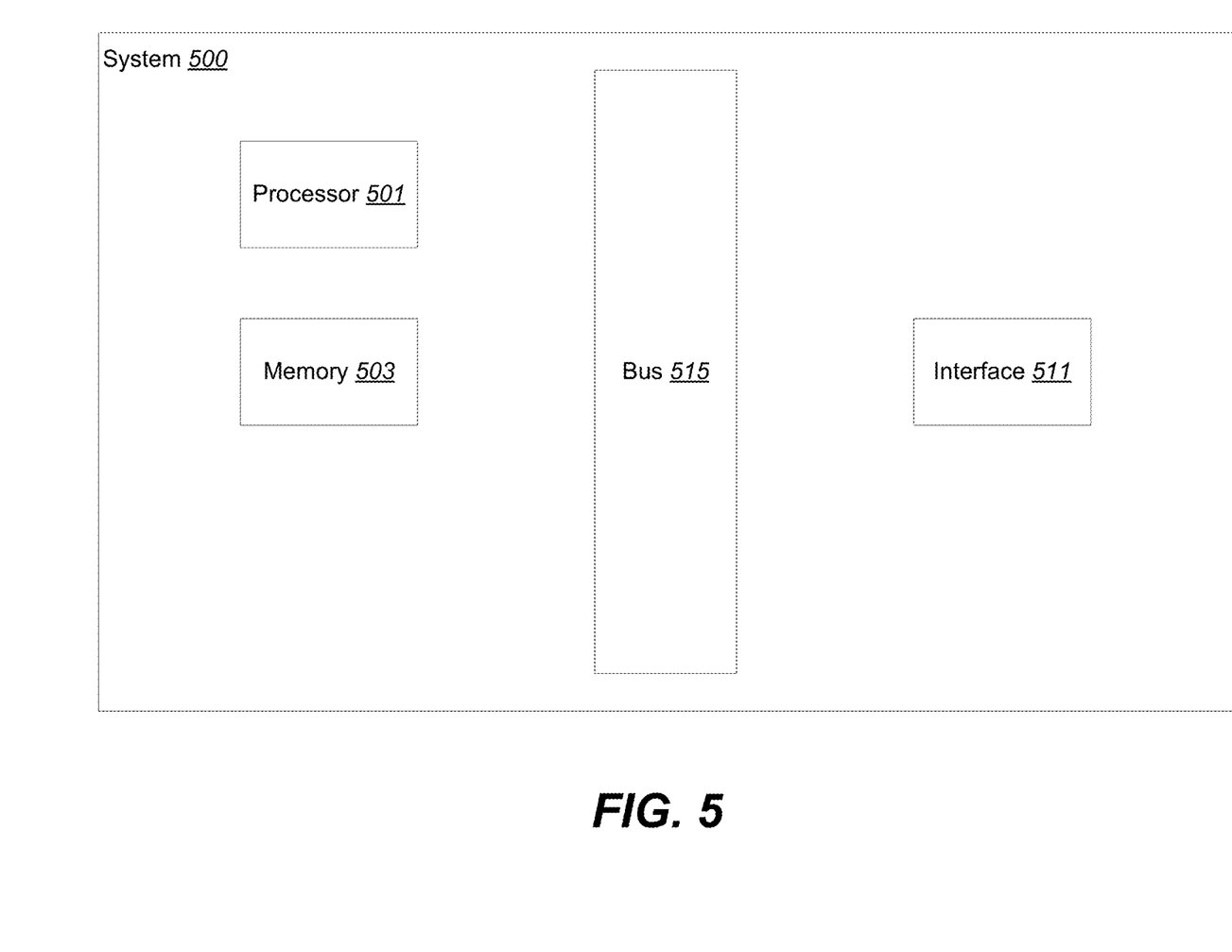
FIG. 5 example of a computer system that can be used to implement particular examples in the present disclosure.

With reference to FIG. 5, shown is a particular example of a computer system that can be used to implement particular examples of the present invention. For instance, the computer system 500 can be used to augment multi-view image data with synthetic objects using IMU and image data, according to various embodiments described above. According to particular example embodiments, a system 500 suitable for implementing particular embodiments of the present invention includes a processor 501, a memory 503, an interface 511, and a bus 515 (e.g., a PCI bus). The interface 511 may include separate input and output interfaces, or may be a unified interface supporting both operations. When acting under the control of appropriate software or firmware, the processor 501 is responsible for such tasks such as optimization. Various specially configured devices can also be used in place of a processor 501 or in addition to processor 501. The complete implementation can also be done in custom hardware. The interface 511 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention. Moreover, although particular features have been described as part of each example, any combination of these features or additions of other features are intended to be included within the scope of this disclosure. Accordingly, the embodiments described herein are to be considered as illustrative and not restrictive.

What is claimed is:

1. A method comprising:
receiving a selection of an anchor location for a synthetic object to be placed within a multi-view image;
computing movements between a reference image and a target image using visual tracking information associated with the multi-view image;
generating a first synthetic image corresponding to a target view associated with the target image, wherein the first synthetic image is generated by placing the synthetic object at the anchor location using visual tracking information associated with the anchor location in the multi-view image and orienting the synthetic object using the inverse of the movements computed between the reference image and the target image, wherein the anchor location includes three-dimensional coordinates corresponding to 2D coordinates specified in the reference image along with a depth perpendicular to the plane of the reference image, the depth being triangulated, wherein generating the first synthetic image includes scaling the triangulated depth based on scale changes in the multi-view image; and overlaying the first synthetic image on the target image to generate an augmented image from target view of the target image.

2. The method of claim 1, wherein the synthetic object is located at a fixed position relative to the anchor location.

3. The method of claim 1, wherein the synthetic object moves relative to the anchor location.

4. The method of claim 1, wherein the synthetic object is animated.

5. The method of claim 4, wherein animation of the synthetic object is based on an amount of time that passes during viewing of the multi-view image, and wherein the animation is independent of navigation through the multi-view image.

6. The method of claim 4, wherein animation of the synthetic object is dependent on navigation of the multi-view image, wherein the animation is dependent on spatial movement of the camera.

7. The method of claim 4, wherein the synthetic object is represented by a video.

8. The method of claim 1, wherein the synthetic object is transparent or semi-transparent in at least one view associated with the multi-view image.

9. The method of claim 1, wherein the multi-view image includes dynamic content.

10. The method of claim 1, wherein the multi-view image includes dynamic context.

11. A non-transitory computer readable medium comprising:

receiving a selection of an anchor location for a synthetic object to be placed within a multi-view image;

computing movements between a reference image and a target image using visual tracking information associated with the multi-view image;

generating a first synthetic image corresponding to a target view associated with the target image, wherein the first synthetic image is generated by placing the synthetic object at the anchor location using visual tracking information associated with the anchor location in the multi-view image and orienting the synthetic object using the inverse of the movements computed between the reference image and the target image, wherein the anchor location includes three-dimensional coordinates corresponding to 2D coordinates specified in the reference image along with a depth perpendicular to the plane of the reference image, the depth being triangulated, wherein generating the first synthetic image includes scaling the triangulated depth based on scale changes in the multi-view image; and overlaying the first synthetic image on the target image to generate an augmented image from target view of the target image.

12. The non-transitory computer readable medium of claim 11, wherein the synthetic object is located at a fixed position relative to the anchor location.

13. The non-transitory computer readable medium of claim 11, wherein the synthetic object moves relative to the anchor location.

14. The non-transitory computer readable medium of claim 11, wherein the synthetic object is animated.

15. The non-transitory computer readable medium of claim 14, wherein animation of the synthetic object is based on an amount of time that passes during viewing of the multi-view image, and wherein the animation is independent of navigation through the multi-view image.

16. The non-transitory computer readable medium of claim 14, wherein animation of the synthetic object is dependent on navigation of the multi-view image, wherein the animation is dependent on spatial movement of the camera.

17. The non-transitory computer readable medium of claim 14, wherein the synthetic object is represented by a video.

18. The non-transitory computer readable medium of claim 11, wherein the synthetic object is transparent or semi-transparent in at least one view associated with the multi-view image.

19. The non-transitory computer readable medium of claim 11, wherein the multi-view image includes dynamic content.

20. A system comprising:

a processor; and memory, wherein the memory stores instructions for:

receiving a selection of an anchor location for a synthetic object to be placed within a multi-view image;

computing movements between a reference image and a target image using visual tracking information associated with the multi-view image;

generating a first synthetic image corresponding to a target view associated with the target image, wherein the first synthetic image is generated by placing the synthetic object at the anchor location using visual tracking information associated with the anchor location in the multi-view image and orienting the synthetic object using the inverse of the movements computed between the reference image and the target image, wherein the anchor location includes three-dimensional coordinates corresponding to 2D coordinates specified in the reference image along with a depth perpendicular to the plane of the reference image, the depth being triangulated, wherein generating the first synthetic image includes scaling the triangulated depth based on scale changes in the multi-view image; and overlaying the first synthetic image on the target image to generate an augmented image from target view of the target image.

* * * * *